United States Patent [19]
Suyama et al.

[11] 3,967,316
[45] June 29, 1976

[54] DATA RECORDER

[75] Inventors: Satoshi Suyama; Kazuhiko Endow, both of Yokohama, Japan

[73] Assignee: The Tsurumi-Seiki Co., Ltd., Yokohama, Japan

[22] Filed: Dec. 17, 1974

[21] Appl. No.: 533,622

[30] Foreign Application Priority Data
Dec. 22, 1973 Japan............................ 48-303174

[52] U.S. Cl. ............................................... 360/51
[51] Int. Cl.² ............................................ G11B 5/09
[58] Field of Search ............................... 360/51, 52

[56] References Cited
UNITED STATES PATENTS

| | | | |
|---|---|---|---|
| 3,512,146 | 5/1970 | Smith et al. | 360/52 |
| 3,614,757 | 10/1971 | Burr | 360/52 |
| 3,631,427 | 12/1971 | Hein et al. | 360/52 |
| 3,831,196 | 10/1974 | Thorpe | 360/52 |
| 3,838,449 | 9/1974 | Sims, Jr. | 360/52 |
| 3,865,002 | 2/1975 | Shimizu | 360/52 |

*Primary Examiner*—Vincent P. Canney

[57] ABSTRACT

A data recorder comprises a DC motor for driving a magnetic tape, a buffer register for temporarily storing input data, a counter adapted to be counted up by a value corresponding to an amount of data stored in the buffer register, a D-A converter connected to the counter and adapted to generate an output signal in accordance with the counted value and control the rotation of the motor, and a decoder for generating an output in accordance with the rotation speed of the motor. The data is read out from the buffer register in response to the output of the decoder and recorded onto the magnetic tape while at the same time the counter is counted down.

6 Claims, 1 Drawing Figure

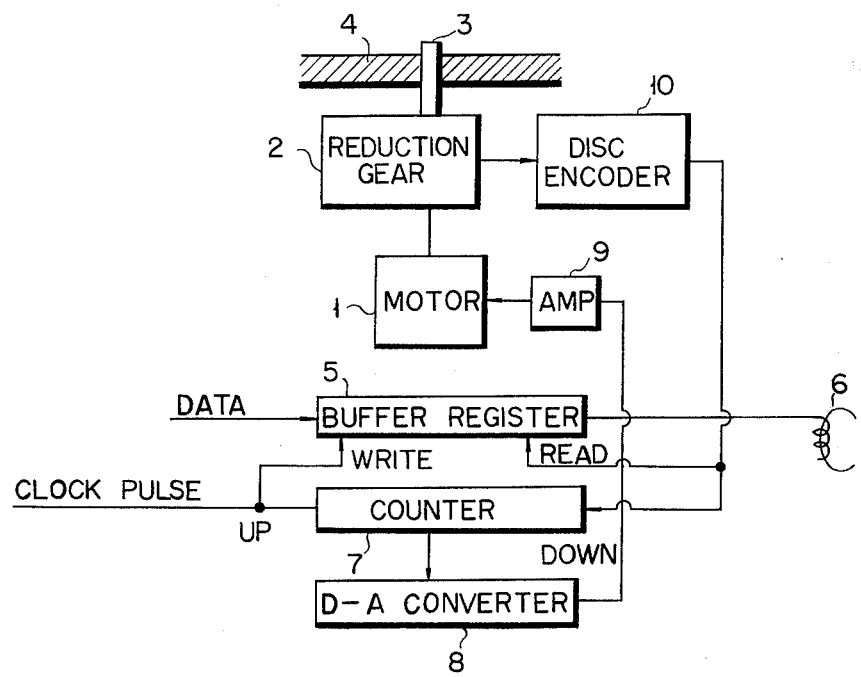

DATA RECORDER

This invention relates to a data recorder.

A conventional data recorder is adapted to drive a magnetic tape by a stepping motor and record data to the magnetic tape by an incremental method. The data recorder of such type has the advantage that, even if time intervals exist between input data, the data can be recorded with a high density. Since the tape recorder recordes the data at high speed, a high-speed stepping motor is of necessity required. The use of such recorder, however, is restricted only at a place where a power source of great capacity is utilized, since a great power consumption is involved.

It is accordingly the object of this invention to provide a data recorder capable of effecting high-speed recording with a lower power consumption. The data recorder according to this invention includes a motor for imparting a relative motion between a recording medium and a transducer for recording data to the recording medium, a memory device for temporarily storing the data, and a control device for controlling the rotation speed of the motor in response to an amount of data stored in the memory device. The memory device is read out in accordance with the rotation speed of the motor, and the read out data is fed to the transducer and recorded onto the recording medium.

This invention can be more fully understood from the following detailed description when taken in conjunction with the accompanying drawing, in which:

The FIGURE is a block diagram of a data recorder according to one embodiment of this invention.

In the FIGURE, a DC motor 1 is coupled through a speed reducing device 2 to a capstan 3 to transmit the rotation force of the motor to the capstan 3 with the rotation speed of the motor 1 reduced. A recording medium i.e. a magnetic tape 4 is travelled in a manner to be sandwiched between the capstan 3 and a pinch roller not shown. A memory device such as, for example, a buffer register 5 is provided for temporarily storing data to be recorded on the magnetic tape. Each time the data is inputted to the buffer register 5, a counter 7 is counted up in response to clock pulses which are supplied to the counter 7. To the counter 7 is coupled a D-A converter 8 for generating an output in proportion to the number of counts made by the counter 7. The output of the D-A converter 8 is amplified at an amplifier 9 and then supplied to the motor 1 so as to control the rotation speed of the motor 1. The speed reducing device 2 is coupled to a disc encoder 10. The disc encoder 10 generates an output pulse according to the rotation of the motor 1 which is transmitted through the speed reducing device 2. The encoder 10 may be constituted of oppositely arranged light sources and light receiving elements, and a rotation disc disposed between the light source and the light receiving disc. The output pulse of the encoder 10 is supplied to the buffer register 5 to effect a readout operation, and also to the counter 7 to effect a countdown operation. The data read out from the buffer register 5 is supplied through a transducer i.e. a magnetic head 6 to the magnetic tape 4 where it is stored.

With a data recorder so arranged, when a data emerges, it is stored in the buffer register 5 and at the same time the counter 7 is counted up one step. By the counting up of the counter 7 the output of the D-A converter 8 is creased to cause the motor 1 to be accelerated. The rotation of the motor 1 is transformed into a pulse signal through the disc encoder 10. By the output pulse of the encoder the stored data of the buffer register 5 is read out according to the rotation speed of the motor 1 and is recorded through the magnetic head 6 to the magnetic tape 4. At this time, the counter 7 is counted down by the output of the encoder 10. As a result, the output of the D-A converter 8 is decreased, causing the speed of the motor to be reduced.

When any high-speed data enters into a data recorder, it is temporarily stored in the buffer register 5, permitting a delay of the rise of rotation of the motor 1 to be compensated for. Consequently, the data is uniformly recorded on the magnetic tape. Since the buffer register 5 needs only to temporarily store any data only when the input speed of the data is rapidly changed, it can fully perform its function even if it has a smaller storage capacity.

The counter 7 is counted up each time a data enters into the buffer register 5, and counted down each time the data is read out from the counter 7. Therefore, the number of counts made at the counter 7 indicates a data amount stored in the register 5. As the data amount of the register 5 is increased, the output voltage of the D-A converter 8 is increased. As a result, the rotation speed of the DC motor 1 is increased to cause the rotation speed of the capstan coupled through the speed reducing device to the motor 1 to be increased, thereby increasing the travelling speed of the magnetic tape 10. Since, in this case, the disc encoder 10 generates an output pulse corresponding to the rotation speed of the capstan 3, the buffer register 5 is read out at a speed corresponding to the rotation speed of the capstan, that is, the travelling speed of the magnetic tape 4. Consequently, the data is stored on the magnetic tape 4 in such a manner that a predetermined recording density is maintained.

The data recorder according to this invention is capable of effecting high-speed recording with a lower power consumption using the buffer register and the DC motor, and capable of uniformly recording data onto a magnetic tape by temporarily storing the data into the buffer register so as to compensate for the delay of a rise of rotation of the DC motor.

The data recorder finds a wide application. For example, it is suitable for the observation of natural phenomena such as, for example, weather or sea conditions, as well as for recording data for on-board measuring instrument or a medical measuring instrument.

Though with the above-mentioned embodiment a magnetic recording method is used, an electrostatic or photoelectric recording method may be adapted instead. Recording may be effected in such a manner that a recorder for recording data to a recording medium is moved relative to the recording medium.

What we claim is:

1. A data recorder for recording data onto a recording medium comprising: a memory device for temporarily storing therein data produced irregularly; a first means for generating an output signal the level of which is varied correspondingly to an amount of data stored in the memory device; a driving means connected to the first means to vary its driving speed in accordance with the variation in the output signal level of said first means and drive the recording medium at the traveling speed varied correspondingly to the driving speed of the driving means; a second means connected to the driving means to generate a pulse signal which has a pulse interval varied correspondingly to the driving speed of the driving means and which is supplied to the memory device to read out the data from the memory device in response to the pulse signal; and a transducer connected to the read out terminal of the memory device to record the data onto the recording medium.

2. A data recorder for recording data onto a magnetic tape comprising: a memory device for temporarily storing therein data produced irregularly; a first means for generating an output signal the level of which is varied correspondingly to an amount of data stored in the memory device; a driving means connected to the first means to vary the rotation speed of the driving means in accordance with the variation in the output signal level of said first means and drive the recording medium at the traveling speed varied correspondingly to the rotation speed of the driving means; a second means connected to the driving means to generate a pulse signal which has a pulse interval varied correspondingly to the rotation speed of the driving means and which is supplied to the memory device to read out the data from the memory device in response to the pulse signal; and a transducer connected to the read out terminal of the memory device to record the readout data onto the magnetic tape.

3. A data recorder according to claim 2 in which said driving means comprises a motor connected to the first means; a reduction gear coupled to the motor to reduce the rotation speed of the motor, and a capstan coupled to the reduction gear for directly driving the magnetic tape.

4. A data recorder according to claim 2 in which said second means comprises an encoder for converting the rotation speed of the driving means into a predetermined pulse signal.

5. A data recorder according to claim 2, in which said first means comprises a counter adapted to be counted up each time the data is recorded onto the memory device and be counted down each time the data is read out from the memory device, and a D-A converter for generating an output voltage in accordance with the number of counts of the counter and supplying the output voltage to the motor.

6. A data recorder according to claim 2, in which said memory device is constituted of a buffer register.

* * * * *